United States Patent [19]
Bauswell et al.

[11] Patent Number: 5,983,612
[45] Date of Patent: Nov. 16, 1999

[54] REMOVABLE BATTERY TRAY SYSTEM FOR AN ELECTRICALLY POWERED BUNKER RAKE

[75] Inventors: Eric D. Bauswell, Sunnyville, Calif.; Timothy A. Esser, Kenosha, Wis.

[73] Assignee: Textron, Inc., Providence, R.I.

[21] Appl. No.: 08/964,289

[22] Filed: Nov. 4, 1997

Related U.S. Application Data

[63] Continuation-in-part of application No. 08/740,774, Nov. 1, 1996.

[51] Int. Cl.$^6$ .............................. B60K 1/00; B60R 16/04
[52] U.S. Cl. .............................. 56/11.9; 56/16.7; 56/16.9; 180/65.1; 180/68.5
[58] Field of Search .............................. 56/11.9, 10.2 R, 56/10.8, 16.7, 16.9, 12.1, 12.7, 255, 295, DIG. 17, DIG. 20; 30/276; 280/DIG. 5; 180/65.1, 68.5; 187/222

[56] References Cited

U.S. PATENT DOCUMENTS

| | | | |
|---|---|---|---|
| 3,821,997 | 7/1974 | Sieren | 180/68.5 |
| 4,042,055 | 8/1977 | Ward | 180/65.1 X |

FOREIGN PATENT DOCUMENTS

| | | | |
|---|---|---|---|
| 25 45 629 | 4/1977 | Germany | 56/11.9 |

*Primary Examiner*—Anthony Knight
*Attorney, Agent, or Firm*—Meredith Martin Addy Brinks Hofer Gilson & Lione

[57] ABSTRACT

A removable battery tray for an electric bunker rake. The battery tray fits on the frame of the bunker rake during operation, and can be easily removed by a hoist or other method so that the bunker rake can continue to operate with another charged set of batteries. The battery tray also has a central power connector that is used for charging and is the only electrical disconnect required when changing the battery tray.

7 Claims, 7 Drawing Sheets

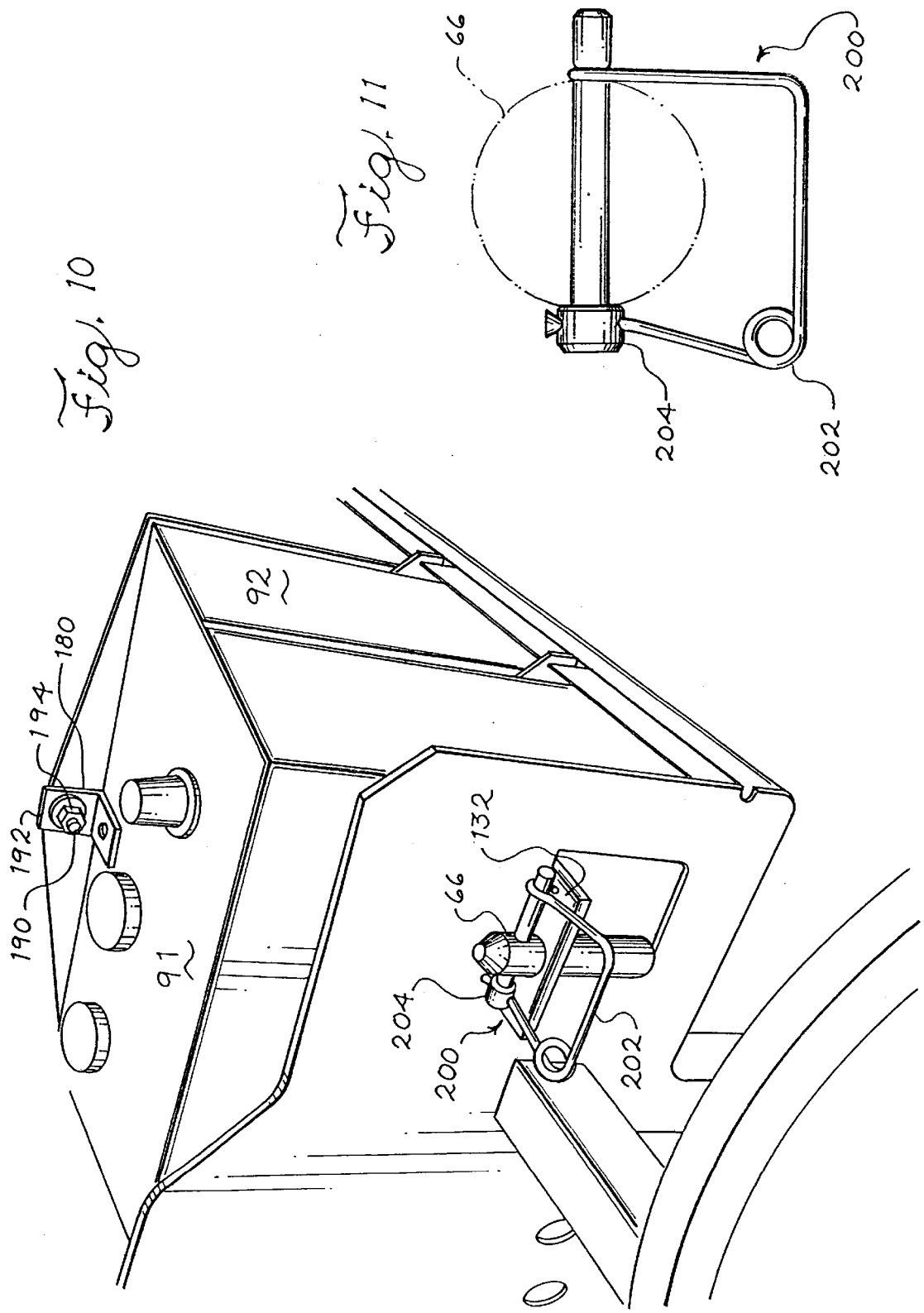

REMOVABLE BATTERY TRAY SYSTEM FOR AN ELECTRICALLY POWERED BUNKER RAKE

This is a continuation-in-part of copending application Ser. No. 08/740,774 currently pending, to Fillman et al. entitled "Removable Battery Tray System for An Electrically Powered Mower"

BACKGROUND OF THE INVENTION

1. Field of the Invention

This invention relates in general to electrically powered vehicles and relates specifically to an electrically powered bunker rake with a removable, rechargeable battery tray system.

2. Prior Art

One application for the present invention is in electrically powered bunker rakes that are used on golf courses, particularly for conditioning sand bunkers. Conventional electrically powered bunker rakes utilize six 6-volt lead-acid deep cycle batteries. Generally, one battery set of six 6-volt or six 8-volt batteries powers the bunker rake for about three to five hours. Once the battery set has discharged, if more bunker conditioning is required, the operator must either re-charge the battery set, which may take eight to twelve hours, or replace the battery set with a fully charged, alternate battery set. The batteries in the battery set are anchored to the bunker rake frame with metal or plastic hold-down brackets. To remove the batteries, the hold-down brackets as well as wiring to each battery must be removed. The process of exchanging the batteries is time consuming and is not conducive to efficiently conditioning all of the bunkers on a golf course.

SUMMARY OF THE INVENTION

A removable battery tray system has been developed for an electrically powered bunker rake.

The system incorporates a removable battery tray that houses a battery set and a detachable power connector used for charging the battery set. When the battery set becomes discharged, the operator drives to a designated area, removes the battery tray containing the discharged battery set from the bunker rake, replaces the tray with another tray housing a fully charged set of batteries and is ready to operate again.

One object of the present invention, therefore, is to allow for increased range of the bunker rake when operating on golf course bunkers.

Another object of the present invention is to provide an easily removable, exchangeable tray for the electric bunker rake battery set so that when discharged, the entire battery set can be quickly and efficiently replaced with a charged battery set in another tray.

A further object of the present invention is to provide a single, detachable power connector for the battery set so that all of the batteries can be easily recharged without needing to independently connect and charge each battery separately.

These and other objects, features, and advantages of the present invention will be apparent from the accompanying drawings and from the detailed description that follows.

BRIEF DESCRIPTION OF THE DRAWING

The present invention is illustrated by way of example and not limitation in the figures of the accompanying drawings, in which like references indicate similar elements and in which:

FIG. 10 is a perspective view of the battery hold down brackets and spring pin lock of the removable battery tray of the present invention; and FIG. 11 is a close up view from above of the spring pin and spring lock that may be used in accordance with the present invention.

DETAILED DESCRIPTION OF THE PREFERRED EMBODIMENTS

Figure 1:
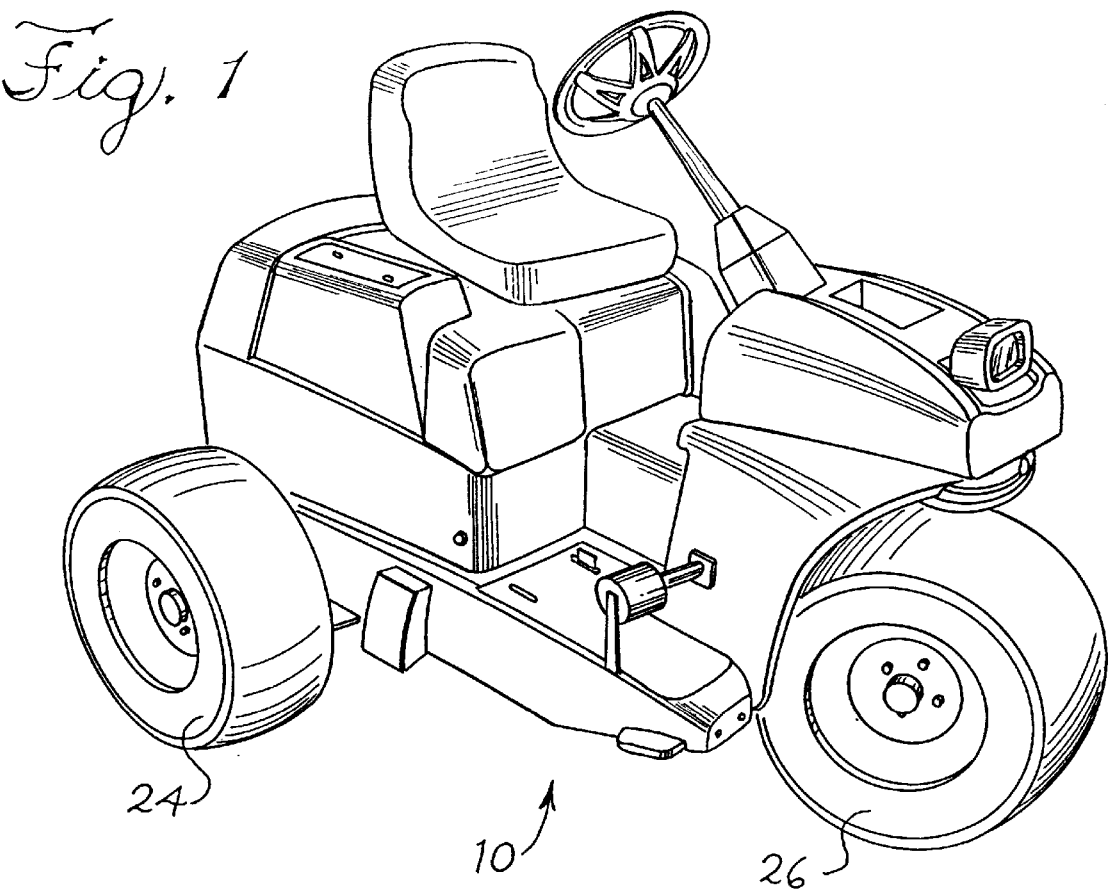
FIG. 1 shows a general illustration of an electric bunker rake in accordance with the present invention.
Figure 2:
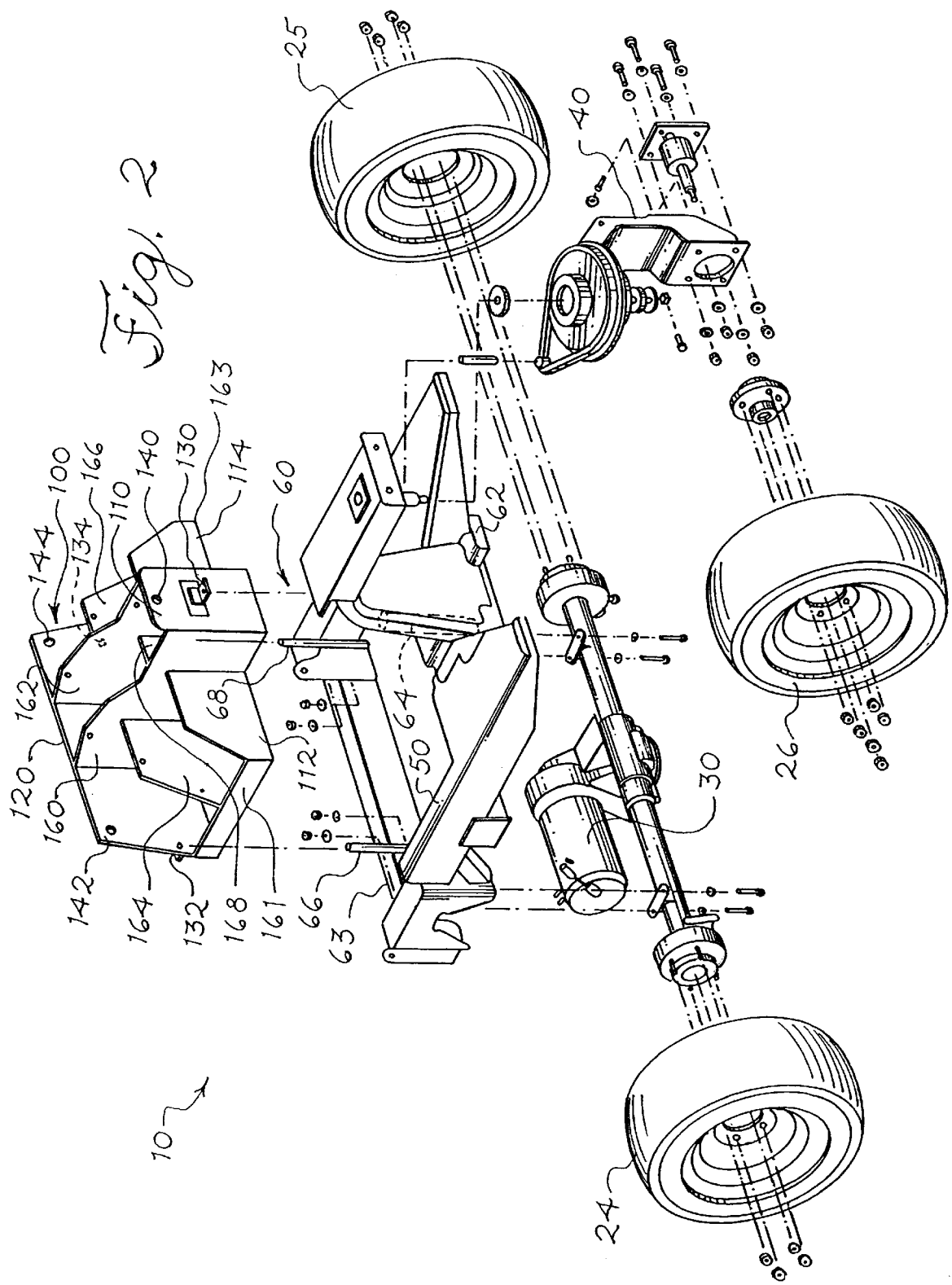
FIG. 2 is an exploded, perspective view of one embodiment of the removable battery tray for the electric bunker rake of the present invention.
Figure 6:
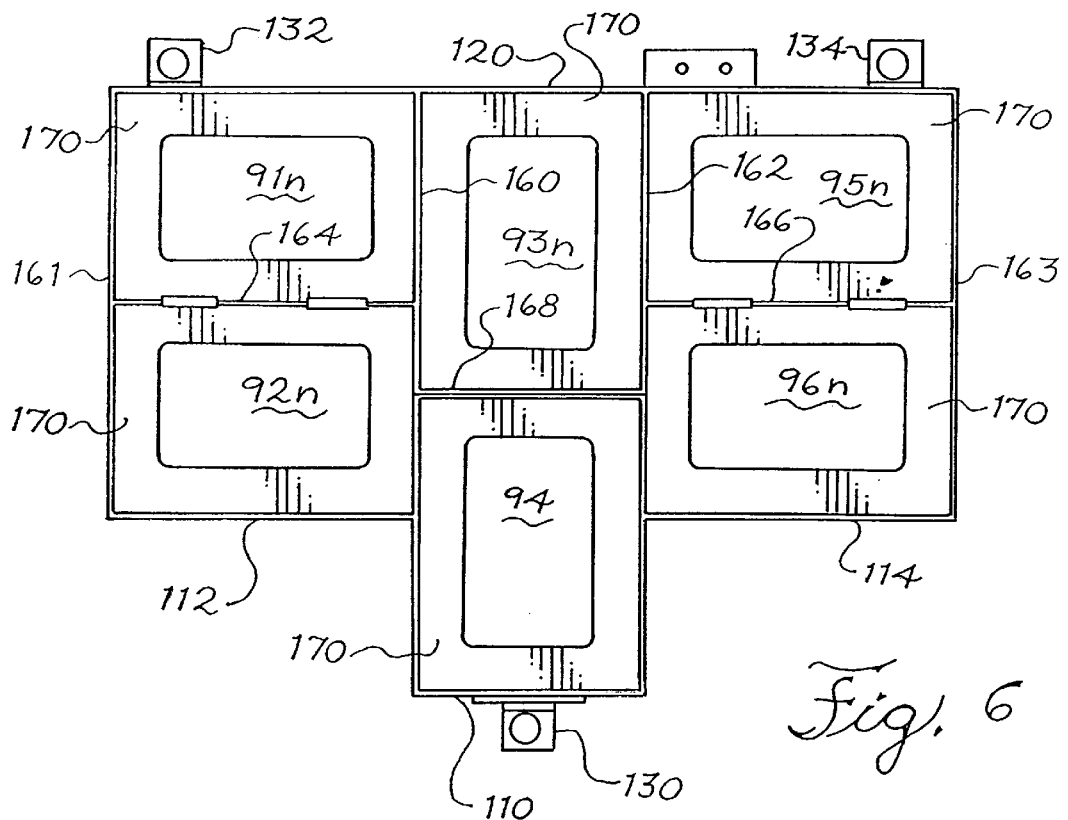
FIG. 6 is an overhead view of the removable battery tray of the current invention.

In the Figures, a removable battery tray 100 is provided for an electric bunker rake 10. FIG. 1 is a general illustration of the bunker rake 10 utilizing the present invention. In the embodiment shown in FIG. 1, the bunker rake 10 of the present invention includes three wheels 24, 25 (FIG. 2), and 26. Two rear drive wheels 24 and 25 are powered by electric drive motor 30(FIG. 2). The front wheel 26 is positioned ahead and between the two rear drive wheels 24 and 25 and is pivotable to steer the bunker rake 10. Conventional rake units (not shown) are positioned in alignment behind the wheels 24 and 25. The rakes are designed for optimal performance in a variety of conditions. Ideally, the rakes are removable to allow for use of other attachments such as a spiker or a grader or even different types of rakes. The rakes are mounted on a power lift arm (not shown). The operator raises and lowers the power lift arm by flipping a switch on control panel 50. When in the lowered or operative position, the lift arm allows free vertical motion of the rakes or other attachments. The electric drive motor 30 is powered by a battery set 90 (FIG. 6). Ideally, more than one battery is provided in the battery set 90 to deliver optimum power to the electric bunker rake 10. On small units, however, a single battery constituting the battery set 90 is possible. The batteries in the set 90 are located in the battery tray 100 (FIGS. 2, 5–8).

Figure 7:
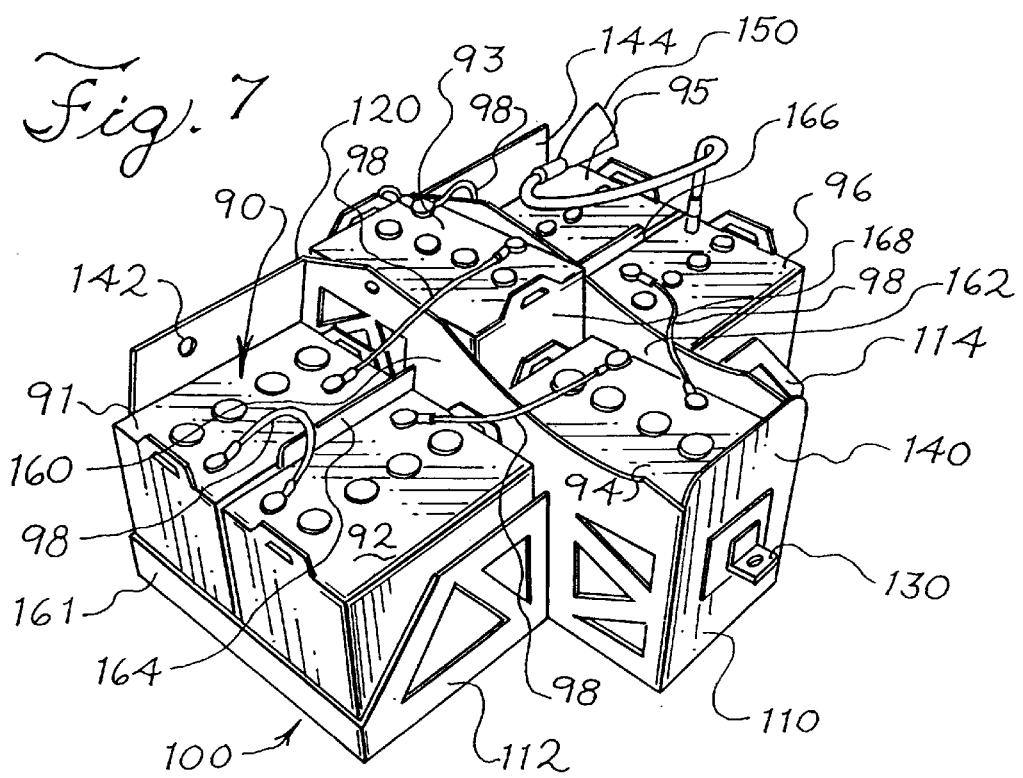
FIG. 7 is an overhead view of the removable battery tray of FIG. 2 with the batteries on board.

FIG. 2 is an exploded view of the electric bunker rake 10. The bunker rake 10 has frame 60. Rear wheels 24 and 25 are positioned on either side of frame 60 and are driven by drive motor 30. Front wheel 26 is positioned in the center of the front portion of frame 60 and is operably attached to steering assembly 40. Removable battery tray 100 is positioned on top of the frame 60 of the bunker rake 10. Support posts 66 and 68 are located symmetrically on the rear portion of the frame 60 and support post 64 (shown in phantom) is located in the center front portion of frame 60. As will be discussed in detail below, the support posts 64, 66, and 68 are used to removably secure the removable battery tray 100 to the bunker rake frame 60. The removable battery tray 100 has a front portion 110, a rear portion 120, and nests for the six batteries 91 92, 93, 94, 95, and 96 (FIG. 7). Removable battery tray 100 also has frame support brackets 130, 132, and 134 each containing a hole in the center. Frame support bracket 130 is located on the front portion 120 of the battery tray 100, and frame support brackets 132, 134 are located on the rear portion 120 of the removable battery tray 100. When the removable battery tray 100 is positioned on the bunker rake 10, each of the frame support brackets 130, 132, and 134 is secured over support posts 64, 66 and 68 respectively. The combination of the support posts 64, 66, and 68 and the frame support brackets 130, 132, and 134 functions to create a removable battery tray placement system.

The removable battery tray 100 allows for easy removal of a discharged battery set 90 (FIG. 7), and easy installation of another tray 100 containing a charged battery set 90. The removable battery tray has tray openings 140, 142, and 144. Tray opening 140 is located on the front portion 110 of the removable battery tray 100, and tray openings 142 and 144 are located on the rear portion 120 of the removable battery tray 100. These tray openings 140, 142, and 144 are optionally used in conjunction with a hoist as shown in copending application Ser. No. 08/740,774 (filed on Nov. 1, 1996 and commonly assigned to the assignee of the present application) to easily remove a used battery tray 100 with batteries 91–96 that need to be recharged, and to replace the used battery tray 100 with a new battery tray 100 with a charged set of batteries 91–96 so that manicuring the bunkers can efficiently continue while the first battery set 90 is recharging. Of course other methods of removal of the removable battery tray 100 can be used as well while still remaining within the spirit and scope of the present invention.

Figure 3:
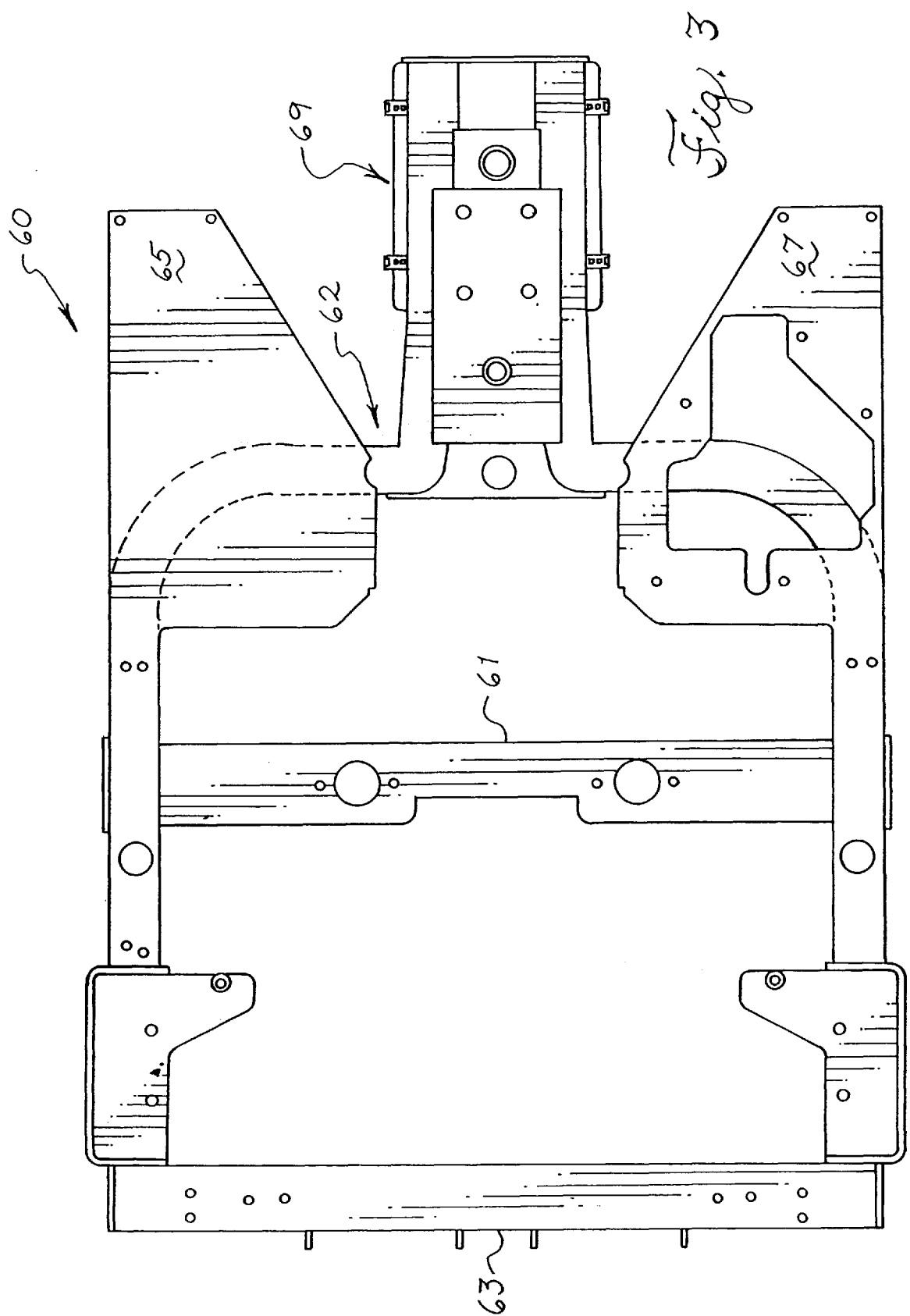
FIG. 3 is an overhead view of the bunker rake frame assembly where the battery tray is placed.
Figure 4:
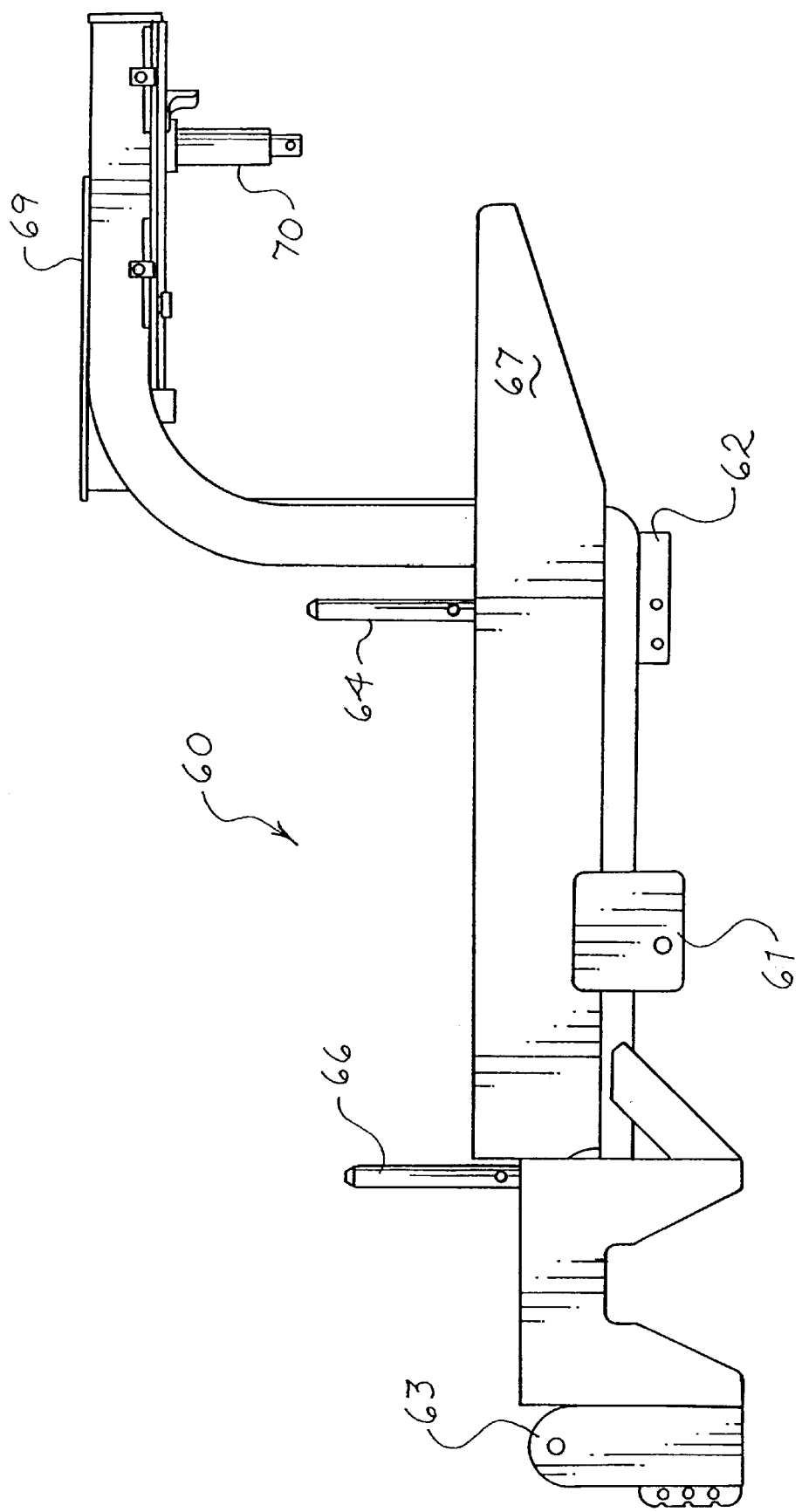
FIG. 4 is a side view of the bunker rake frame assembly.

FIGS. 3 and 4 are overhead and side views respectively of the bunker rake frame 60. The bunker rake frame 60 has center frame portion 61, rear frame portion 63, and front frame portion 62. Front wheel support 69 extends from the center of front frame portion 62 and includes front wheel attachment 70 (FIG. 4). Left and right foot panels 65 and 67 are secured above the front frame portion 62.

Figure 5:
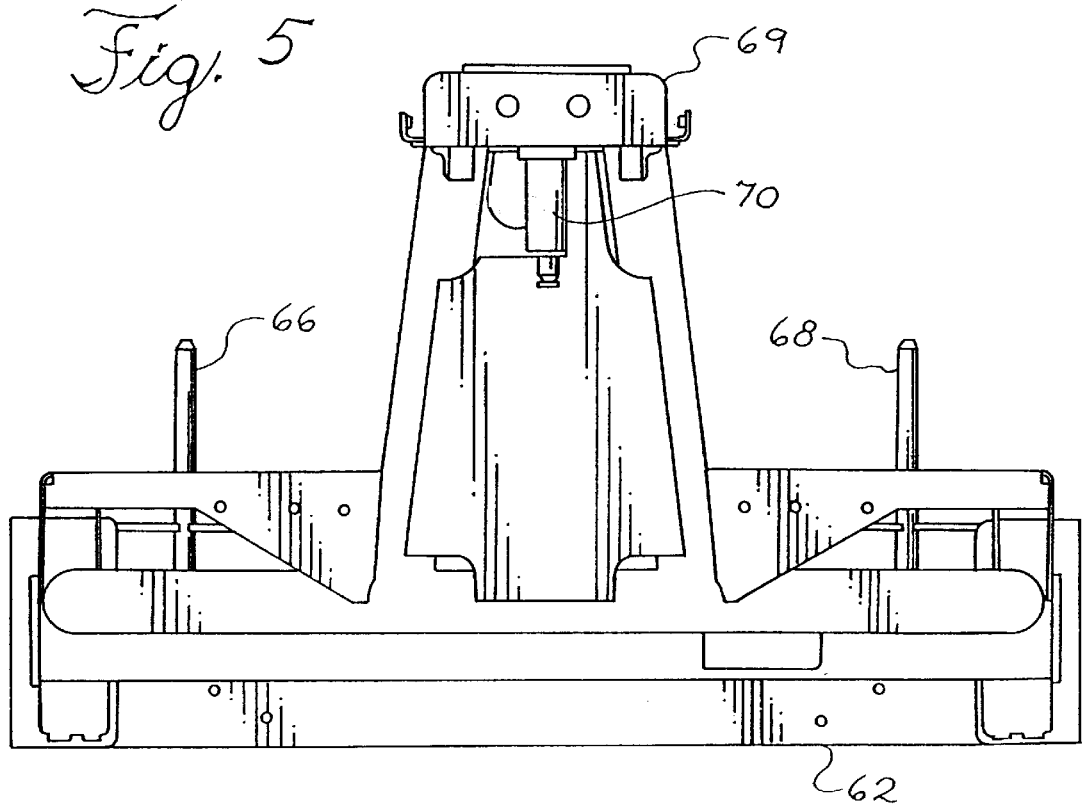
FIG. 5 is a front view of the bunker rake frame assembly.

FIG. 5 is a front view of the bunker rake frame 60 showing the front frame portion 62, front wheel support and attachment 69 and 70, and the two rear support posts 66 and 68. Front support post 64 is located behind the front wheel support 69 and thus cannot be seen in FIG. 5.

FIG. 6 is an overhead view of the removable battery tray 100 of the presently disclosed embodiment. The front tray member 110 has side portions 112 and 114 that are recessed to match the shape of the battery nests. Each battery 91–96 in the battery set 90 has its own nest in the battery tray 100. The nests are represented as 91n–96n in FIG. 6. Each nest has a hollow portion in its center to allow for air circulation, to reduce weight, and to allow any liquid to drain from the nests, and each nest is separated by a transverse support member 164, 166, or 168 which acts as a support. Longitudinal support members 160 and 162 are secured between the front tray portion 110 and the rear tray portion 120 to provide transverse support to the removable battery tray and to provide partial nest walls for the batteries 91–96. Left and right outermost, longitudinal sidewalls, 161 and 163 respectively, provide lateral support for batteries 91–96. Rear tray member 120 has frame support brackets 132 and 134 each having a hole in the center to permit the battery tray 100 to be secured to the bunker rake frame 60 via support posts 66 and 68 respectively. Front tray member 110 also has frame support bracket 130 which interacts with support post 64 in the same manner to help secure the removable battery tray 100 to the frame 60 of the trap rake 10.

As discussed above, each battery 91–96 in the battery set 90 nests in a nest provided with lower supports 170 that are open in the center to allow for air circulation and easy debris removal and side walls that are made up of either the front or rear tray portions 110 (including 112 and 114) or 120, the longitudinal sidewalls 161 and 163, the longitudinal support members 160 or 162, or the transverse support members 164 or 166. These support members and tray portions 160, 162, 164,166, and 110, 112, 114, 120 also preferably contain cut out sections to increase the air circulation in the removable battery tray 100. The cut-out sections of the support members 170, 160, 162, 164, 166, 110, 112, 114, and 120 also provide for a lighter removable battery tray 100 for easier, more efficient removal while still providing substantial support for the removable battery tray 100 and the battery set 90.

FIG. 7 shows the removable battery tray 100 with the battery set 90 installed. Each battery 91–96 fits in its respective nest 91n–96n. Each of the batteries 91–96 is electrically connected in series via wires 98. One of the terminals of each of batteries 95 and 96 is connected to power connector 150. Power connector 150 is electrically connected to each of the batteries via wires 98, and the power connector is designed so that when it is connected to a charger, each of the batteries 91–96 in the battery set 90 can be charged without having to disconnect them from each other or remove them from the removable battery tray 100. In this way, when the batteries 91–96 need to be charged, the removable battery tray 100 can be removed from the bunker rake 10 and operably connected to the charger. While the batteries 91–96 in the removable battery tray 100 are charging, another charged battery tray 100 can be replaced on the bunker rake 10, and bunker conditioning can continue efficiently while the original batteries 91–96 in the first battery tray 100 are being charged. Optionally, a fuse (not shown) can be connected in series between two of the batteries to protect the battery set 90.

Figure 8:
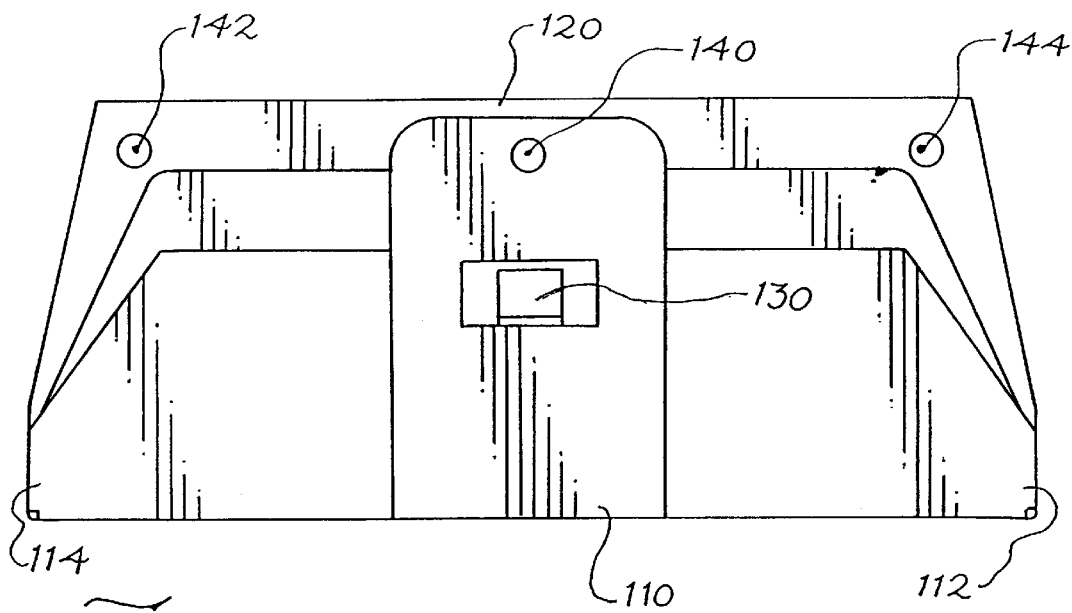
FIG. 8 is a front view of the removable battery tray of the current invention.
Figure 9:
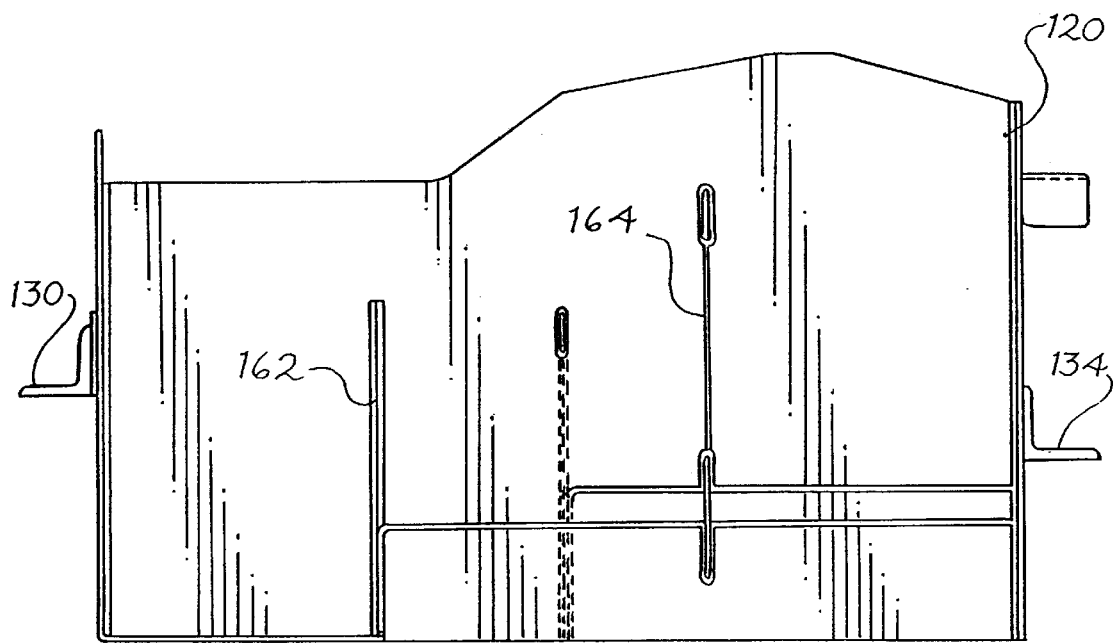
FIG. 9 is a rear view of the removable battery tray of the current invention.

FIGS. 8 and 9 show side views of the front and rear portions 110 and 120 respectively. In FIG. 8, front portion 110 is shown with recessed side portions 112 and 114. Frame support bracket 130 to aid in securing the removable battery tray 100 to the bunker rake 10 as discussed above, is also shown as well as tray opening 140 to aid in removal of the removable battery tray 100. Tray openings 142 and 144 located on the rear tray portion can also be seen as part of rear tray portion 120. FIG. 9 is rear tray portion 120 of the removable battery tray 100. Joining ends of tray support members 160 and 162 are fixedly attached to the inside of rear tray portion 120 and are shown in phantom in FIG. 9.

FIG. 10 shows the removable battery tray 100 optionally including battery hold down L-clips 180 located on each side of the battery tray 100 to secure the batteries 91, 92 and 95, 96. Both ends of each battery hold down L-clip 180 can be secured to the removable battery tray 100 by a bolt 190 that passes through both the removable battery tray 100 and the battery hold down L-clip 180. The bolt 190 ideally is secured to the battery hold down L-clip 180 with a flat washer 192 and a nut 194. One skilled in the art will recognize that there are many other ways to secure the batteries 91–96 to the removable battery tray 100 within the scope of the present invention.

FIGS. 10 and 11 show an optional spring lock system 200 that can be used to provide more safety and support for the removable battery tray 100 on the bunker rake frame 60. Those skilled in the art will recognize that while the spring lock system 200 is only shown with respect to support bracket 132 and support post 66, it optionally can be installed on any or all of the support brackets 130, 132, and 134 and respective support posts 64, 66, and 68. Support post 66 passes through the hole in frame support bracket 132 and is provided with a spring metal clip 202 attached on opposing sides to secure the spring lock system 200 in place. In FIG. 11, support post 66 is shown from above in phantom with horizontal cross pin 204 passing through the horizontal opening in support post 66. Spring metal clip 202 is attached at opposing ends to each end of the horizontal cross pin 204 to secure the spring lock system 200 in place. This arrangement allows for increased lateral support without requiring all three frame support brackets 130, 132, and 134 to have a support post and spring lock system 200.

In the foregoing specification, the invention has been described with reference to specific embodiments thereof. It will, however, be evident that various modifications and changes may be made thereto without departing from the broader spirit and scope of the invention as set forth in the appended claims.

For example, features of the embodiments disclosed in copending application Ser. No. 08/740,774, of which this application is a continuation-in-part can be incorporated into the embodiments disclosed herein.

Additionally, a bunker rake with a different shaped frame would require a different removable battery tray arrangement to fit that frame. A removable battery tray can be designed to fit a bunker rake with a T-shape which three of the batteries are placed on one side of the center frame support and three are placed on the other side. Other types of frames are envisioned where the batteries in the removable battery tray are arranged on two or multiple levels. These and other arrangements for a removable battery tray for an electrically powered bunker rake fall within the scope of the present invention.

Other techniques for securing the removable battery tray to the bunker rake frame are included within the scope of the present invention as are other means of removing the removable battery tray from the bunker rake frame. The specification and drawings are, accordingly, to be regarded in an illustrative rather than a restrictive manner.

We claim:

1. An electric bunker rake comprising:

a frame;

a plurality of wheels connected to the frame wherein at least one of the plurity of wheels is a drive wheel;

an electric drive motor operably connected to the drive wheel, the electric drive motor powered by a battery set;

a pin projecting from the frame;

a removable battery tray having a bracket with an opening therethrough for recieving the pin when the battery tray is placed on the frame, thereby securing the battery tray to the frame.

2. The electric bunk rake of claim 1 wherein the pin includes a transverse opening and further comprising a second pin configured to be placed through the opening to secure the first pin in position with respect to the bracket.

3. The electric bunk rake of claim 2 wherein the second pin has a front end and a back end, the front end and the back end extend on either side of the first pin and wherein the second pin includes a strip of flexible material having a first end and a second end, the first end of the flexible material attaches to the front end of the pin and the second end of the flexible material attaches to the back end of the pin.

4. The electric bunk rake of claim 1 wherein the battery set includes one or more batteries.

5. The electric bunk rake of claim 1 wherein the battery tray further includes:

a front portion and a rear portion; and a longitudinal support member having a first end and a second end, the first end of the longitudinal support member connected to the front portion of the removable battery tray, and the second end of the longitudinal support member being connected to the rear portion of the removable battery tray.

6. The electric bunk rake of claim 1 wherein the battery tray further includes:

a front portion having a first opening to aid in removal of the battery tray; and a rear portion having a second opening to aid in removal of the battery tray.

7. The electric bunk rake of claim 1 further including a plurality of pins and a plurality of brackets each with opening therethrough for receiving a corresponding pin when the battery tray is placed on the frame, thereby securing the battery tray to the frame.

* * * * *

UNITED STATES PATENT AND TRADEMARK OFFICE
CERTIFICATE OF CORRECTION

PATENT NO. : 5,983,612
DATED : November 16, 1999
INVENTOR(S) : Eric D. Bauswell, et al It is certified that error appears in the above-identified patent and that said Letters Patent is hereby corrected as shown below:

Column 2, line 55, after "has", insert --a--.

Column 3, line 1, after "91", insert --,--.

Column 6, line 10, claim 2, "bunk" should be --bunker--.

Column 6, line 14, claim 3, "bunk" should be --bunker--.

Column 6, line 21, claim 4, "bunk" should be --bunker--.

Column 6, line 23, claim 5, "bunk" should be --bunker--.

Column 6, line 32, claim 6, "bunk" should be --bunker--.

Column 6, line 38, claim 7, "bunk" should be --bunker--.

UNITED STATES PATENT AND TRADEMARK OFFICE
CERTIFICATE OF CORRECTION

PATENT NO. : 5,983,612
DATED : November 16, 1999
INVENTOR(S) : Eric D. Bauswell, et al It is certified that error appears in the above-identified patent and that said Letters Patent is hereby corrected as shown below:

On the title page, item [56], under U. S. Patent Documents

```
--5,540,037  07/30/96   Lamb et al. . . . . . . 056/007--.
--5,406,778  04/18/95   Lamb et al. . . . . . . 056/007--.
--5,251,721  10/12/93   Ortenheim . . . . . . 180/298--.
--3,797,600  03/19/74   Miner . . . . . . . . . . 180/298--.
```

FOREIGN PATENT DOCUMENTS

```
--WO 95/20868   PCT  08/10/95--.
--WO 97/28681   PCT  08/14/97--.
```

Signed and Sealed this

Twenty-seventh Day of March, 2001

Attest:

NICHOLAS P. GODICI

Attesting Officer

Acting Director of the United States Patent and Trademark Office